United States Patent
Wight et al.

(10) Patent No.: US 10,256,678 B2
(45) Date of Patent: Apr. 9, 2019

(54) WIRELESS ENERGY TRANSFER USING ALIGNMENT OF ELECTROMAGNETIC WAVES

(71) Applicant: Teslonix Inc., Ottawa (CA)

(72) Inventors: James Stuart Wight, Ottawa (CA); Rony Everildo Amaya, Kanata (CA); Cezary Paul Slaby, Ottawa (CA); Boris Spokoinyi, Ottawa (CA)

(73) Assignee: Teslonix Inc., Ottawa (CA)

( * ) Notice: Subject to any disclaimer, the term of this patent is extended or adjusted under 35 U.S.C. 154(b) by 175 days.

(21) Appl. No.: 15/424,752

(22) Filed: Feb. 3, 2017

(65) Prior Publication Data

US 2017/0149294 A1 May 25, 2017

Related U.S. Application Data

(63) Continuation-in-part of application No. 14/923,847, filed on Oct. 27, 2015.

(Continued)

(51) Int. Cl.
*H02J 50/90* (2016.01)
*H04B 17/318* (2015.01)
(Continued)

(52) U.S. Cl.
CPC ............. *H02J 50/90* (2016.02); *H02J 7/025* (2013.01); *H02J 50/20* (2016.02); *H02J 50/40* (2016.02); *H04B 17/318* (2015.01)

(58) Field of Classification Search
CPC . H02J 50/90; H02J 50/40; H02J 7/025; H04B 17/318
See application file for complete search history.

(56) References Cited

U.S. PATENT DOCUMENTS 3,510,788 A 5/1970 Wollesen
3,534,294 A 10/1970 Auer
(Continued)

FOREIGN PATENT DOCUMENTS

WO 2007084716 A3 12/2007
WO 2014102828 A2 7/2014

OTHER PUBLICATIONS

European Patent Office Search Report for 15855996.3, nationalized from PCT/IB2015002192, dated Feb. 13, 2018; 10 pages.

(Continued)

*Primary Examiner* — Daniel Cavallari-See
(74) *Attorney, Agent, or Firm* — Atesa Legal PLLC

(57) ABSTRACT

A method for improved wireless energy transfer includes steering a first energy beam, having a fundamental frequency, towards an energizable device. The first energy beam is formed by a plurality of polarizers of a first power access point (PAP). A first polarity of the first energy beam is aligned at the energizable device to a second polarity of a second energy beam formed by a second PAP, physically separate from, and having a wireless connection to, the first PAP, by combining at each of the polarizers of the first PAP a respective first polarized signal with a respective second polarized signal. The respective second polarized signal is formed by rotating the respective first polarized signal. The second PAP receives a PAP signal via the wireless connection and locally generates the fundamental frequency from the PAP signal.

20 Claims, 9 Drawing Sheets

Switched Beam Beam-Steering

Related U.S. Application Data

(60) Provisional application No. 62/136,142, filed on Mar. 20, 2015, provisional application No. 62/073,448, filed on Oct. 31, 2014, provisional application No. 62/085,450, filed on Nov. 28, 2014, provisional application No. 62/129,325, filed on Mar. 6, 2015, provisional application No. 62/292,926, filed on Feb. 9, 2016, provisional application No. 62/292,933, filed on Feb. 9, 2016, provisional application No. 62/292,938, filed on Feb. 9, 2016.

(51) Int. Cl.
*H02J 7/02* (2016.01)
*H02J 50/40* (2016.01)
*H02J 50/20* (2016.01)

(56) References Cited

U.S. PATENT DOCUMENTS

| | | |
|---|---|---|
| 4,103,260 A | 7/1978 | Buchman |
| 4,241,316 A | 12/1980 | Knapp |
| 4,496,909 A | 1/1985 | Knapp |
| 4,503,403 A | 3/1985 | Taylor et al. |
| 4,710,977 A | 12/1987 | Lemelson |
| 5,883,829 A | 3/1999 | Wagt |
| 6,184,696 B1 | 2/2001 | White et al. |
| 6,798,716 B1 | 9/2004 | Charych |
| 6,882,227 B2 | 4/2005 | Barry et al. |
| 6,967,462 B1 | 11/2005 | Landis |
| 7,068,991 B2 | 6/2006 | Parise |
| 7,482,273 B1 | 1/2009 | Klein et al. |
| 7,566,889 B1 | 7/2009 | Klein et al. |
| 7,626,134 B1 | 12/2009 | Klein et al. |
| 7,711,441 B2 | 5/2010 | Tillotson |
| 8,232,748 B2 | 7/2012 | Treas et al. |
| 8,384,314 B2 | 2/2013 | Treas et al. |
| 8,760,743 B2 | 6/2014 | Lal et al. |
| 8,948,847 B2 | 2/2015 | Afsar et al. |
| 9,124,125 B2 | 9/2015 | Leabman et al. |
| 9,384,376 B2 | 7/2016 | Sabesan et al. |
| 2006/0001509 A1 | 1/2006 | Gibbs |
| 2008/0275572 A1 | 11/2008 | Tillotson |
| 2009/0315412 A1 | 12/2009 | Yamamoto et al. |
| 2010/0188027 A1 | 7/2010 | Treas et al. |
| 2010/0315045 A1 | 12/2010 | Zeine |
| 2011/0080267 A1 | 4/2011 | Clare et al. |
| 2012/0162010 A1 | 6/2012 | Georgiadis et al. |
| 2013/0016814 A1 | 1/2013 | Treas et al. |
| 2013/0137455 A1 | 5/2013 | Xia et al. |
| 2013/0303901 A1 | 11/2013 | Afsar et al. |
| 2014/0043487 A1 | 2/2014 | Marandos et al. |
| 2014/0078568 A1 | 3/2014 | Lal et al. |
| 2014/0080264 A1 | 3/2014 | Chan et al. |
| 2014/0138432 A1 | 5/2014 | Park et al. |
| 2014/0175893 A1 | 6/2014 | Sengupta et al. |
| 2014/0266480 A1 | 9/2014 | Li et al. |
| 2014/0354064 A1 | 12/2014 | Tseliakhovich |
| 2015/0022009 A1 | 1/2015 | Leabman et al. |
| 2015/0311754 A1* | 10/2015 | Tani ............... H02J 50/40 307/104 |
| 2015/0340875 A1 | 11/2015 | Prasad |
| 2016/0049824 A1* | 2/2016 | Stein ............... H04W 4/70 320/108 |
| 2016/0054396 A1* | 2/2016 | Bell ............... G06F 1/1635 324/764.01 |
| 2016/0087483 A1* | 3/2016 | Hietala ............... H02J 50/10 320/108 |
| 2017/0116443 A1 | 4/2017 | Bolic et al. |

OTHER PUBLICATIONS

Non-Final Office Action dated May 11, 2018 for U.S. Appl. No. 14/923,847, 16 pages.

PCT International Search Report and Written Opinion for PCT/IB2017/000162, dated Jun. 16, 2017; 8 pages.

PCT International Search Report and Written Opinion for PCT/IB2017/000174, dated Jun. 9, 2017; 10 pages.

Jing Feng et al, "Energy-efficient transmission for beamforming in wireless sensor networks," Sensor Mesh and Ad Hoc Communications and Networks (SECON), 2010 7th Annual IEEE Communications Society Conference on. IEEE, 2010; 9 pages.

PCT International Search Report and Written Opinion for PCT/IB2015/002192, dated Jan. 21, 2016; 8 pages.

Stefan Berger et al., "Carrier Phase Synchronization of Multiple Distributed Nodes in a Wireless Network," Signal Processing Advances in Wireless Communications, 2007, SPAWC 2007, IEEE 8th Workshop on. IEEE 2007; 5 pages.

Wight et al., "A Microstrip and Stripline Crossover Structure," IEEE Transactions on Microwave Theory and Techniques, May 1976; 1 page.

Korean Non-Final Office Action for 10-2017-7011095, dated Jun. 8, 2018; 8 pages.

Final Office Action for U.S. Appl. No. 14/923,847, dated Nov. 8, 2018; 21 pages.

EPO Office Action for Application No. 15 855 996.3, dated Nov. 26, 2018; 5 pages.

\* cited by examiner

Controllable Slant Linear Polarization

Switched Beam Beam-Steering

WIRELESS ENERGY TRANSFER USING ALIGNMENT OF ELECTROMAGNETIC WAVES

CROSS-REFERENCE TO RELATED APPLICATIONS

This application is a utility application claiming priority to co-pending U.S. Provisional Application Ser. No. 62/292,926 filed on Feb. 9, 2016 entitled "PHASOR DECOMPOSITION," co-pending U.S. Provisional Application Ser. No. 62/292,933 filed on Feb. 9, 2016 entitled "SWITCHED BEAM POLARIZATION ALIGNMENT," co-pending U.S. Provisional Application Ser. No. 62/292,938 filed on Feb. 9, 2016 entitled "RECEIVER LOCATION DETERMINATION," and to co-pending U.S. patent application Ser. No. 14/923,847, filed on Oct. 27, 2015, entitled, "WIRELESS ENERGY TRANSFER USING ALIGNMENT OF ELECTROMAGNETIC WAVES," which claims priority to U.S. Provisional Application Ser. No. 62/073,448 filed on Oct. 31, 2014 entitled "DISTANCE WIRELESS CHARGING USING CHARGING STATIONS," U.S. Provisional Application Ser. No. 62/085,450 filed on Nov. 28, 2014 entitled "WIRELESS POWER TRANSFER AS APPLIED TO SOLAR PANELS," U.S. Provisional Application Ser. No. 62/129,325 filed on Mar. 6, 2015 entitled "WIRELESS POWER TRANSFER USING ELECTROMAGNETIC WAVES ALIGNMENT," and U.S. Provisional Application Ser. No. 62/136,142 filed on Mar. 20, 2015 entitled "WIRELESS POWER TRANSMISSION," the entireties of which are incorporated by reference herein.

FIELD

This disclosure relates generally to wireless energy transfer, and more specifically to efficient systems and methods for the wireless transfer of energy using alignment of electromagnetic waves.

BACKGROUND

Increased processing and connectivity capabilities of portable devices have resulted in a corresponding increase in the energy consumption of these devices. Furthermore, there are practical physical limits as to how much energy a portable device can store, thus necessitating frequent charging of these devices. Tethered solutions to powering portable devices are limited in part due to a lack of standardization of the connectors between the power cable and device, the weight and reliability of the charging cables, restrictions on the operating environment (e.g., underwater or hazardous areas), and the general constraints on mobility that tethered solutions impose.

Wireless charging of portable devices, has previously been limited to short distances (e.g. on the order of centimeters) by near-field techniques such as inductive or capacitive coupling. Far-field techniques that use lasers or microwave beams involve dangerously high power levels, particularly in an environment including humans. Lasers and microwave beams are also typically limited to line-of-sight applications.

Improvements in the capabilities of portable devices have also helped enable an environment of an Internet of Things (IoT) wherein large and dense deployments of devices could collectively share information. However, previous solutions have been limited in their ability to efficiently power devices in an IoT environment, where the devices require mobility, and have significantly different power consumption requirements. Similarly, increased usage of Radio Frequency Identification (RFID) tags requires an efficient way of powering devices in a mobile environment without tethering, using dangerously high levels of power, or imposing undue restrictions on the placement of charging stations used to charge the RFID tags.

BRIEF SUMMARY

As will be appreciated, embodiments as disclosed herein include at least the following. In one embodiment, an improved system for wireless energy transfer comprises a first power access point (PAP) configured to direct a first energy beam to an energizable device. The first energy beam has a fundamental frequency and a first polarity. A second PAP is physically separate from the first PAP, and has a wireless connection to, and is configured to direct a second energy beam to the energizable device. The second energy beam has the fundamental frequency and a second polarity. A plurality of polarizers of the first PAP is configured to form the first energy beam directed to the energizable device, and to align the first polarity with the second polarity at the energizable device, and wherein the second PAP is enabled to receive a PAP signal via the wireless connection and is further enabled to locally generate the fundamental frequency from the PAP signal.

Alternative embodiments of the improved system for wireless energy transfer include one of the following features, or any combination thereof. Each of the polarizers include a patch antenna including a dielectric substrate interposed between a resonant plate and a ground plate, the patch antenna including a first feed-point and a second feed-point, a first variable gain amplifier (VGA) connected to the first feed-point and configured to adjust a first amplitude of a signal, a first phase shifter between the signal and the first VGA and configured to adjust a phase of the signal, and a second VGA connected to the second feed-point and configured to adjust a second amplitude of the signal, the patch antenna controlling a polarization of the signal. The first phase shifter is configured to shift the phase of the signal over a range from minus 90 degrees to plus 90 degrees. A second phase shifter is between the signal and the second VGA, wherein the first phase shifter and the second phase shifter both produce a combined shift of the phase of the signal over a range from minus 90 degrees to plus 90 degrees. A number of the plurality of polarizers is divisible by two, and each polarizer is connected to an antenna signal with a Wight Crossover structure. The number of polarizers is four and includes a first cross-over device coupled to a first pair of polarizers, a first pair of hybrid couplers coupled to the first cross-over device and a second pair of polarizers, a second cross-over device coupled to the first pair of hybrid couplers, a second pair of hybrid couplers coupled to the second cross-over device and the first pair of hybrid couplers, a switch coupled to the second pair of hybrid couplers, and a master phase shifter coupled between the antenna signal and the switch. The first polarity is one of vertical, slant, horizontal, circular, elliptical and slant elliptical. A received signal strength indicator is received from the energizable device by the first PAP is used to optimize the alignment of the first polarity with the second polarity. Optimizing the alignment uses a phasor decomposition method.

In another embodiment, a method for improved wireless energy transfer comprises steering a first energy beam, having a fundamental frequency, towards an energizable device, the first energy beam formed by a plurality of polarizers of a first power access point (PAP). A first polarity of the first energy beam is aligned at the energizable device to a second polarity of a second energy beam formed by a second PAP, physically separate from, and having a wireless connection to, the first PAP, by combining at each of the polarizers of the first PAP a respective first polarized signal with a respective second polarized signal. The respective second polarized signal is formed by rotating the respective first polarized signal. The second PAP receives a PAP signal via the wireless connection and locally generates the fundamental frequency from the PAP signal.

Alternative embodiments of the improved method for wireless energy transfer include one of the following features, or any combination thereof. Each of the polarizers of the first PAP combines a rotated first polarized signal with the respective second polarized signal, the second polarized signal having a different rotation than the rotated first polarized signal. Aligning the first polarity to the second polarity is optimized based on a received signal strength indicator (RSSI) received by the energizable device. Aligning uses a phasor decomposition method. The first energy beam and the second energy beam are both sequentially moved from the energizable device to another energizable device, and the alignment is optimized by another RSSI received by the another energizable device. The alignment is optimized concurrently for the energizable device and another energizable device by maximizing the minimum RSSI from each of the energizable device and the another energizable device.

In another embodiment, an improved method for wireless energy transfer comprises steering a plurality of energy beams to an energizable device. Each energy beam has a fundamental frequency. Each energy beam is formed by a respective power access point (PAP) having a plurality of polarizers. Each PAP is physically separate from, and has a wireless connection to, another PAP. One of the PAPs receives a PAP signal via the wireless connection and locally generates the fundamental frequency from the PAP signal. A polarity of each of the energy beams is aligned at the energizable device by combining at each of the polarizers of each respective PAP, a respective first polarized signal with a respective second polarized signal. The respective second polarized signal is formed by rotating the respective first polarized signal. A planar region including a plurality of energizable devices is divided into a plurality of subspaces. Each subspace is defined by an energy beam position from a respective one of the plurality of energy beams. The respective one of the energy beams is scanned along a scan path within the subspace to detect a presence of at least some of the plurality of energizable devices by detecting a change in a received energy at each of the at least some of the plurality of energizable devices. The at least some of the plurality of devices includes a receiving device, and one or more of a neighbor device and a reference device. The reference device has a predetermined location within the planar region. A connectivity map is determined by finding a respective position for each neighbor device relative to a position of the receiving device. A physical location of the receiving device and the neighbor device relative to the reference device is interpolated.

Alternative embodiments of the improved method for wireless energy transfer include one of the following features, or any combination thereof. The location of the receiving device is determined within one wavelength of the respective one of the energy beams. Each subspace is dividing into smaller spaces by sequentially deactivating one energy beam and detecting the presence of a receiving device by a reduction in the received energy at the receiving device. Each subspace is divided into smaller spaces by sequentially deactivating two physically adjacent energy beams and detecting the presence of a receiving device between the two physically adjacent energy beams by a reduction in the received energy at the receiving device. Each subspace is divided into smaller spaces by rotating a polarity of all of the energy beams and detecting the presence of a receiving device by a reduction in the received energy at the receiving device.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of systems and methods described herein provide for improvements to long-range wireless energy transfer from a plurality of Power Access Points (PAPs), (also referred to as transmitters), to at least one energizable device, (also referred to a Receiver of Applied Power, or RAP). In one example, an energizable device is a Radio Frequency Identification (RFID) tag. A device is considered to be energizable when it is capable of receiving radiated EM waves to provide energy for device operation, from long-range wireless energy transfer.

In various embodiments, wireless energy transfer is realized over a long-range, with low transmitted power, or both, by cohering the frequency of multiple energy beams at a point on the energizable device where energy is received (e.g., an antenna). The wireless energy transfer further includes at least one of cohering a phase and cohering a polarity of the energy beams. Various improvements to wireless energy transfer result from the teachings described herein, including one of the following improvements, or any combination thereof.

In various embodiments, the wireless energy transfer is improved by performing phasor decomposition to rapidly determine the contributing amplitude, phase, and polarity from each PAP at each energizable device. Consequently, in some embodiments, the time required to cohere (e.g., align)

the frequency and at least one of the phase and the polarity of the energy beams to each other can be reduced by an order of 10,000 resulting in real time energy beam alignment without requiring iteration. Real time energy beam alignment enables RFID tags to have "instant-on" performance and to remain powered at an optimal level as the tags are moved. In one embodiment, the location of each tag is tracked in real time as the tags are moved.

In other embodiments, the polarization alignment is performed with a switched-beam selection rather than beam steering. Phased array approaches perform faster beam steering, in excess of what is required for power transfer applications, at the expense of increased cost and complexity. By using switched-beam selection for power transfer, the power delivered by the PAPs is increased, and multipath issues are reduced.

In other embodiments, the wireless energy transfer is improved by determining the locations of multiple sensor tags, regardless of whether multi-path distortions are present. A connectivity map is created including the locations of RFID tags relative to RFID reference devices with predetermined locations. The connectivity map is determined by detecting a change in a received signal level at a respective RFID tag illuminated by a scanned energy beam. Other methods are employed to improve the resolution of the connectivity map, including selective deactivation of energy beams and rotating the polarity of the energy beams.

Figure 1:
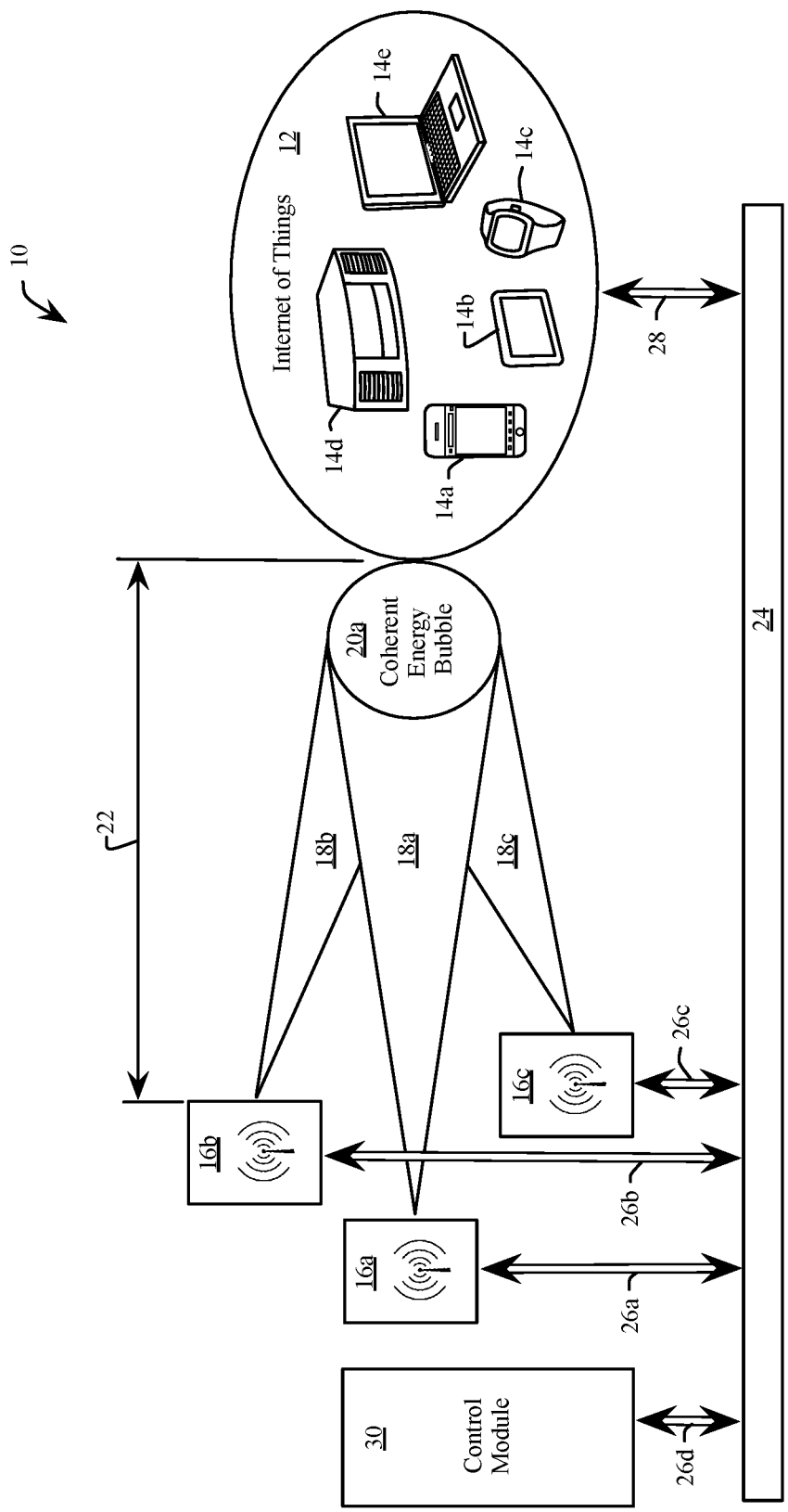
FIG. 1 is a schematic view of an improved system for wireless energy transfer in accordance with an embodiment of the present disclosure.

Referring to FIG. 1 an embodiment 10 of a system for wireless energy transfer provides energy (e.g. "powers") an "Internet of Things" (IoT) 12, including for example a cell phone 14a, a tablet 14b, a smart watch 14c, a stereo 14d and a computer 14e. The energizable devices 14a through 14e (generally 14) are merely illustrative and should not be considered to constrain the potential devices that would comprise the IoT 12. In one example, all of the devices 14 are of the same type. In another example, the devices 14 are low power devices such as RFID tags. In another example, the devices 14 are high power devices, such as motorized wheelchairs. Various embodiments replace the IoT 12 with one or more devices 14 that need not be associated with, nor communicate, with one another.

The devices 14 of the IoT 12 receive energy from a plurality of PAPs 16a, 16b and 16c (generally 16). Each PAP 16a, 16b and 16c emits a respective energy beam 18a, 18b and 18c (generally 18), wherein each of the energy beams has at least one EM wave. Each of the EM waves of at least two energy beams is directed (e.g. focused) at a receiving location of one of the devices 14 to optimize the energy received by the one device. By further aligning both the frequency and at least one of the phase and the polarity of each EM wave of each energy beam focused at the receiving location, a coherent energy bubble 20a is formed. In the context of this disclosure, references to aligning the frequency, phase or polarity of energy beams should be understood to mean aligning (or cohering) the EM waves within each energy beam and between energy beams.

For clarity of illustration, the coherent energy bubble 20a in FIG. 1 is shown adjacent to the IoT 12 environment, and formed by three energy beams 18. In practice, each coherent energy bubble is formed by at least two energy beams and is focused at a point (e.g., a receiving antenna) on one of the devices 14 to maximize the received power by the one device. In one embodiment, more than one coherent energy bubble is formed, with each coherent energy bubble focused on a different device. In another embodiment, at least one coherent energy bubble is timed-shared between several devices.

The range 22 of the PAPs 16 to transmit a sufficient energy level to an energizable device 14 depends in part on the required power that the device 14 needs to receive, the number of energy beams 18 used to form the coherent energy bubble, limitations on the power of each of the energy beams 18 (e.g. due to FCC limitations based on safe operating levels for living organisms), and the absorption characteristics of the transmission medium through which the energy is transmitted.

In one embodiment, the energy delivered by each of the energy beams 18 is adjusted by communication through a communication medium 24. The communication medium 24 connects one or more devices 14 in the IoT 12 over a path 28, to one or more of the PAPs 16a, 16b and 16c and to a control module 30, over respective paths 26a, 26b, 26c and 26d (generally 26). In various embodiments, the communication medium 24 is a physical structure such as a back plane. In other embodiments, the communication medium is the same medium that is used by the energy beams 18. In one example, the communication medium is air (e.g. a terrestrial environment). In another example, the communication medium is at least a partial vacuum as found in orbital altitudes or outer space. In another example, the communication medium is either fresh or salt water.

Communication between the devices 14 and the PAPs 16 is used to optimize (e.g. maximize) the transfer of power from the PAPs 16 to the devices 14. For example, each of the beams 18 are directed (e.g. steered) towards one or more devices to maximize a received energy level at the respective device as communicated from the respective device to at least one of the PAPs 16. Similarly, the phase for each of the energy beams 18 is adjusted by the PAPs 16 to maximize the received energy level at the respective device. In some embodiments, the polarity of each of the energy beams 18 is also aligned to maximize the received energy at the respective device. Communication over the paths 26 and 28 and through the medium 24 includes for example, the use of one or more of the IEEE 802.3 Ethernet standards, one or more the IEEE 802.11 WiFi® standards, one or more of the Bluetooth® standards, one or more of the IEEE 802.15.4 ZigBee® standards, a proprietary communication protocol, any wired or wireless communication protocol or any combination of the foregoing.

Figure 2:
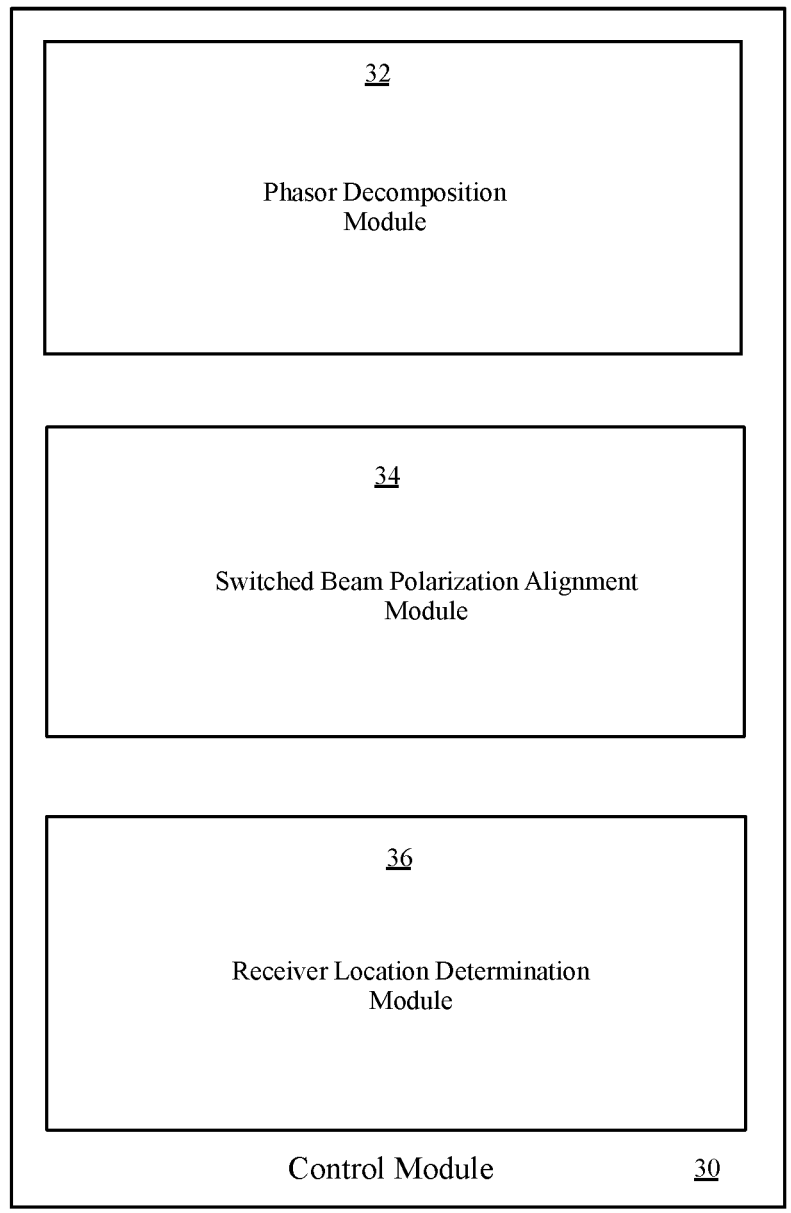
FIG. 2 is a functional block diagram of a Control Module.

FIG. 2 shows a functional block diagram of the control module 30 of FIG. 1. The Control Module 30 includes a Phasor Decomposition Module 32, a Switched Beam Polarization Alignment Module 34, and a Receiver Location Determination Module 36. In one embodiment, each module of the Control Module 30 is implemented with circuitry. Various embodiments of the Control Module 30 include one or more of the Phasor Decomposition Module 32, the Switched Beam Polarization Alignment Module 34, and the Receiver Location Determination Module 36 to implement the respective functions described herein.

Phasor Decomposition Method (PDM):

A Phasor Decomposition Method (PDM) described herein reduces the number of phase adjustments typified by iterative methods (e.g., Gradient Ascent). Improvements in the time required to achieve optimum power delivered to an energizable device (e.g., sensor, tag or battery) is on the order of 1,000 to 10,000 times for 10 to 100 sensor tags per PAP respectively when compared to iterative methods. Very fast transmission (e.g., less than 100 us) of information containing Phasor contributions from each PAP received at each energizable device location is sent from the energizable device to either one or more PAPs, or other devices that control the PAPs. The speed of the transmission is limited by the communication bandwidth between PAPs and the energizable devices and the number of available communication channels (e.g., in the time, frequency, or spatial domains). This Phasor information can also be used for dynamic localization of sensor tags or to detect motion of people in the way of the communication path between a PAP and an energizable device. Dynamic localization is particularly beneficial in changing environments (e.g. people walking or sensors moving), a busy warehouse, industrial settings (e.g. with conveyor belts), coffee shops, stores, houses or an office and can be used to help compliance with emission standards.

With PDM, the time required to achieve optimal power (Topt) at all sensor tag locations is Topt=4*N*Ts+Tcomm, where N is the number of PAPs, Ts is the phase/polarization update rate (e.g., 2 us to 50 us), and Tcomm is a communication channel update rate (e.g., 1 ms-100 ms). In contrast, iterative methods, such as Gradient Ascent (e.g., Hill Climbing) require multiple iterations to find the maxima leading to Topt on the order of 20*H*(N+1)*(Ts+Tcomm) to 100*H*(N+1)·(Ts+Tcomm), where H is a number of sensors per TX and the factors of 20 and 100 are the number of iterations required in order to reach optimum. Additionally there is no guarantee that an optimal power derived by a Gradient Ascent method will not be a local optimum.

PDM is a method for obtaining the amplitudes, phases and polarization vector phases of a phasor of an EM wave transmitted from each contributing PAP for each energizable device without delays due to iteration, (limited by the number of simultaneous communication channels). The radio frequency (RF) power signal at each sensor tag location is a combination of line-of-sight, reflections, and diffraction of multiple waves from multiple PAP sources in addition to noise.

The description of PDM uses general assumptions and terms as follows. A Power Access Point (PAP) is at a location where RF energy is radiated from. An energizable device is a device that receives radiated RF energy (e.g., an RFID sensor tag). An energizable device is also referred to as a Receiver of Applied Power (RAP). For the purposes of PDM calculation, the phase accuracy (e.g., due to drift) of each PAP with respect to each other is assumed to be small (e.g., <30°) during the phase adjustment period, which, in practice, is in the range of 1 ms to 100 ms, but could be as small as a few micro-seconds and as large as many seconds, depending on the type of synchronization used and the resultant phase accuracy.

The term "phase" refers to the phase of a 2D Phasor, or "Phasor". The term "Phasor" refers to a two dimensional (2D) Phasor represented by either a complex number or a pair of vector coordinates in polar coordinate system, as used throughout this disclosure. Generally, the Phasor can be represented in any other coordinate system. The term "3D Phasor" refers to a three dimensional (3D) vector formed by summing two 2D Phasors at each orthogonal EM wave polarizations. Since EM polarization is generally a "polarization vector", an EM wave can be decomposed into two constituent orthogonal polarizations (e.g., vertical/horizontal), each one having an independent 2D Phasor (e.g., amplitude and phase). The amplitudes in this case would be the amplitudes of the polarization vector, (e.g., same amplitudes as of the constituent 2D Phasors), while the phase of the polarization-vector is the (extra) 3rd dimension of the 3D Phasor "polarization angle" (e.g., a 90 degree polarization angle corresponds to Circular Polarization).

An RSSI reading is a reading of an average power, averaged for at least few cycles of the fundamental (center, or carrier) frequency, such as 915 MHz. Due to the narrow bandwidth occupied during phase adjustments it is assumed that the propagation channel from any PAP to any energizable device can be modeled as a complex constant, and the resultant Phasor at the energizable device location is multiplied by a complex constant for each PAP, resulting in a summation of a product of channel constant per PAP by a PAP's Phasor.

Regarding Fade mitigation, if significant fading is expected then a phase shifting update rate can be reduced to reduce the occupied bandwidth to a point where fading loss is below a threshold. The center frequency can also be adjusted in addition to increasing the phase adjustment period. Either of these two approaches can be done with a feedback from an energizable device. For example, if an energizable device is positioned in the place where waves from one or multiple PAPs add destructively (independent of the 3D phasor), then the center frequency can be adjusted, until either the energizable device starts responding, or the reported RSSI is improved.

Unlike Hill Climbing, PDM in its simplest form, involves adjusting phases by 90° and 180° from some initial phase (Ø0) for each contributing Phasor, except last one. The 90°/180° phase shifts are chosen primarily for easing the computation, and also to achieve a bigger degree of independence of equations (e.g. orthogonality) due to quantization, and other noise, which otherwise would be stronger for small angular changes.

With PDM, a Phasor sum can be represented in terms of a single Phasor and the sum of the rest of the Phasors. The phase of that one Phasor is adjusted by 90, 180 degrees creating 3 equations (0°, +90°, +180° and 3 unknowns, from which the phase and amplitude of that single Phasor is calculated. Although the phase solved is the phase between a single Phasor and the sum of the rest of the Phasors, and not the total sum Phasor, (which is constant). An additional computational step is then performed to convert it to a phase relative to the total sum of the Phasors. This procedure is repeated N−1 times to get amplitudes and phases of all individual Phasor components (the last Phasor is trivial as the sum is known and the rest of the Phasors are known). The resultant combination of Phasors with amplitudes and phases can then optimized in "one shot" by adjusting all phases simultaneously to an optimal configuration. This procedure has an added advantage to get all phases and amplitudes at ALL sensor locations all at once (as long as they receive enough power, and factoring in time multiplexing nature of communication channel).

At a particular time interval, PDM adjusts phases of a signal coming from each PAP sequentially. For each PAP the phase is adjusted by 0°, +90°, +180° at each of two polarization directions, (e.g., a total of 6 phase/polarization values), or any other 6 angles with sufficient difference (other angles that can be decomposed to 0°, 90° angles), while the phases/polarizations of the rest of the PAPs remain at 0° and with a fixed (predefined) polarization. The procedure is repeated for each PAP in a cluster (or a subset). In some embodiments, time slots for phase changes are assigned for each PAP, based on their proximity to each other and to energizable devices to improve the time interval of near-optimal Phasor combinations.

The resultant RSSI readings at each energizable device corresponding to phase/polarization changes at each PAP are recorded by the energizable device when it detects certain jumps in RSSI. This vector of RSSI readings corresponding to 0°, +90°, +180° phase changes at each of 2 polarizations for all PAPs is sent to PAP(s) and it correlates RSSI changes to phase changes. In another embodiment, RSSI measurements are started based on synchronization between PAPs either by synchronizing to the Master or predicting the PAP phase adjustment time based on other information (e.g., communication from PAPs; spurious emissions during phase jumps).

After receiving the RSSI vectors from all sensors, PAPs then solve the equations necessary to get the Phasor of each contributing PAP (including itself and other nearby PAPs). It is also possible for the sensor tag to determine the time slot boundaries (e.g., by observing RSSI changes or the SYNC signal) and/or to solve the equations and return the answer to reduce the size of payload it sends (faster, less energy consumed), or it can wait for a sync packet from Master PAP and time the exact moment when phases are expected to change.

Figure 3:
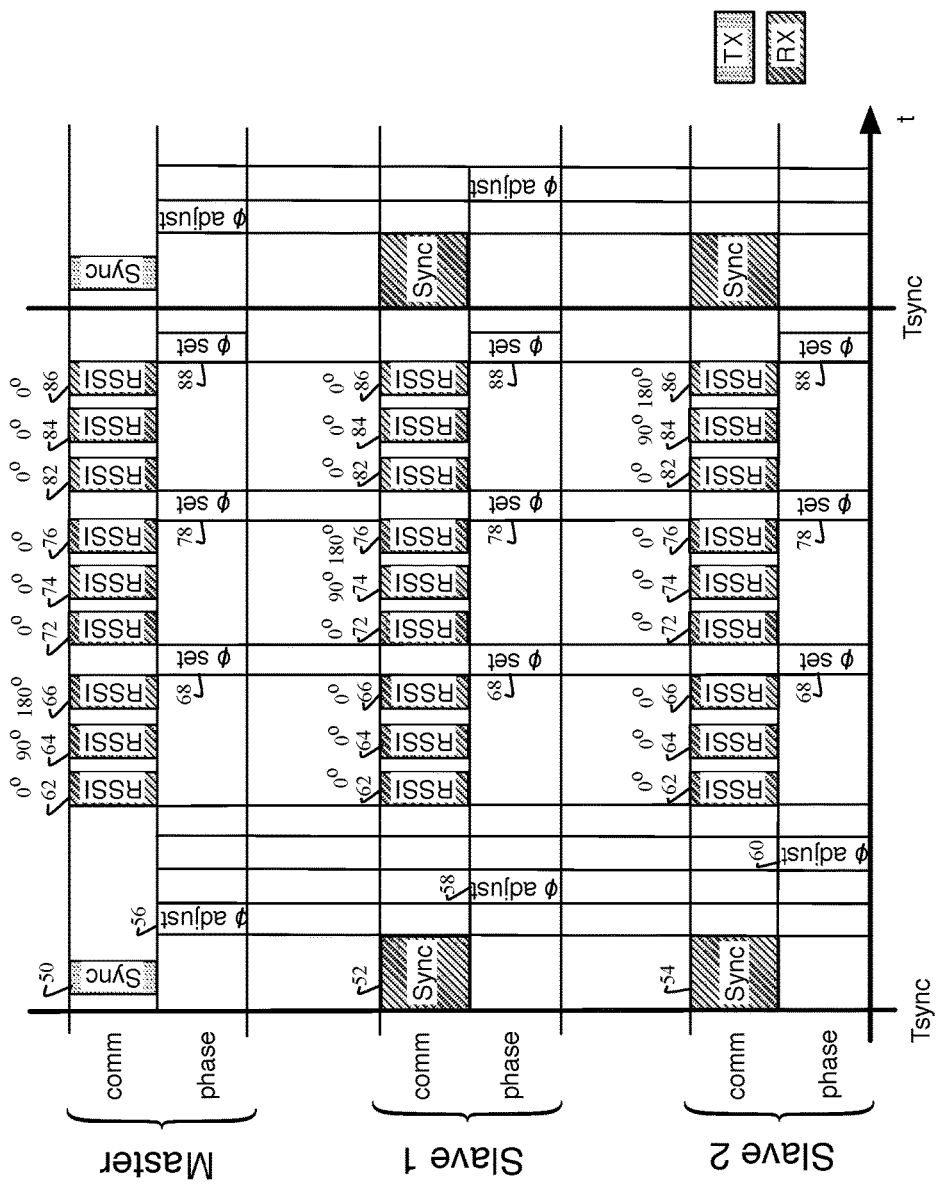
FIG. 3 is a graphical view of a sequence for adjusting phases of a Power Access Point.

FIG. 3 illustrates, an example embodiment of a PDM for adjusting phases of three PAPs including signaling between a Master PAP, a Slave 1 PAP, a Slave 2 PAP and a plurality of energizable devices (e.g., sensors tags). Specifically, the flow events with synchronization (Sync), RSSI readings and phase adjustments are shown. A total of six PAP phase adjustments are made, including 0 degrees, 90 degrees, and 180 degrees for each of two polarizations, (e.g., a total of six adjustments).

In various embodiments, the PDM of FIG. 3 is performed for twice, for each of two phasor polarizations. In embodiments, where polarization alignment is not required, only one PDM cycle is performed. For each polarization, the PDM cycle begins with a synchronization (Sync) pulse 50 transmitted by the Master PAP, and received as a Sync pulse 52 and 54 received by a first energizable device (Slave 1) and a second energizable device (Slave 2) respectively. A polarity is chosen for the transmission from the Master, Slave 1 and Slave 2. At 56, 58 and 60, the Master PAP sequentially adjusts the phasor for the Master, Slave 1 and Slave 2 respectively, based on a phasor decomposition calculation from a previous PDM cycle. At 62, 64, and 66, the Master PAP transmits a phasor with a phase adjustment of 0 degrees, 90 degrees and 180 degrees respectively, while the phase adjustment of the Slave 1 PAP, and the Slave 2 PAP remains at 0 degrees. An RSSI level is measured at each energizable device for each of the three transmitted phases by the Master PAP. At 68, the RSSI values determined from each energizable device, corresponding to each phase of time slots 62, 64 and 66 for each PAP (e.g., Master, Slave 1 and Slave 2) are transmitted to a device for performing a subsequent phasor decomposition calculation. In one embodiment, the device receiving the plurality of RSSI values is the Master PAP.

At 72, 74, and 76, the Slave 1 PAP transmits a phasor with a phase adjustment of 0 degrees, 90 degrees and 180 degrees respectively, while the phase adjustment of the Master PAP, and the Slave 2 PAP remains at 0 degrees. An RSSI level is measured at each energizable device for each of the three transmitted phases by the Slave 1 PAP. At 78, the RSSI values determined from each energizable device, corresponding to each phase of time slots 72, 74 and 76 for each PAP (e.g., Master, Slave 1 and Slave 2) are transmitted to a device for performing a subsequent phasor decomposition calculation. In one embodiment, the device receiving the plurality of RSSI values is the Master PAP.

At 82, 84, and 86, the Slave 2 PAP transmits a phasor with a phase adjustment of 0 degrees, 90 degrees and 180 degrees respectively, while the phase adjustment of the Master PAP, and the Slave 1 PAP remains at 0 degrees. An RSSI level is measured at each energizable device for each of the three transmitted phases by the Slave 2 PAP. At 88, the RSSI values determined from each energizable device, corresponding to each phase of time slots 82, 84 and 86 for each PAP (e.g., Master, Slave 1 and Slave 2) are transmitted to a device for performing a subsequent phasor decomposition calculation. In one embodiment, the device receiving the plurality of RSSI values is the Master PAP. Subsequently, the PDM cycle repeats for the second polarization for embodiments where polarization alignment is required.

Figure 4:
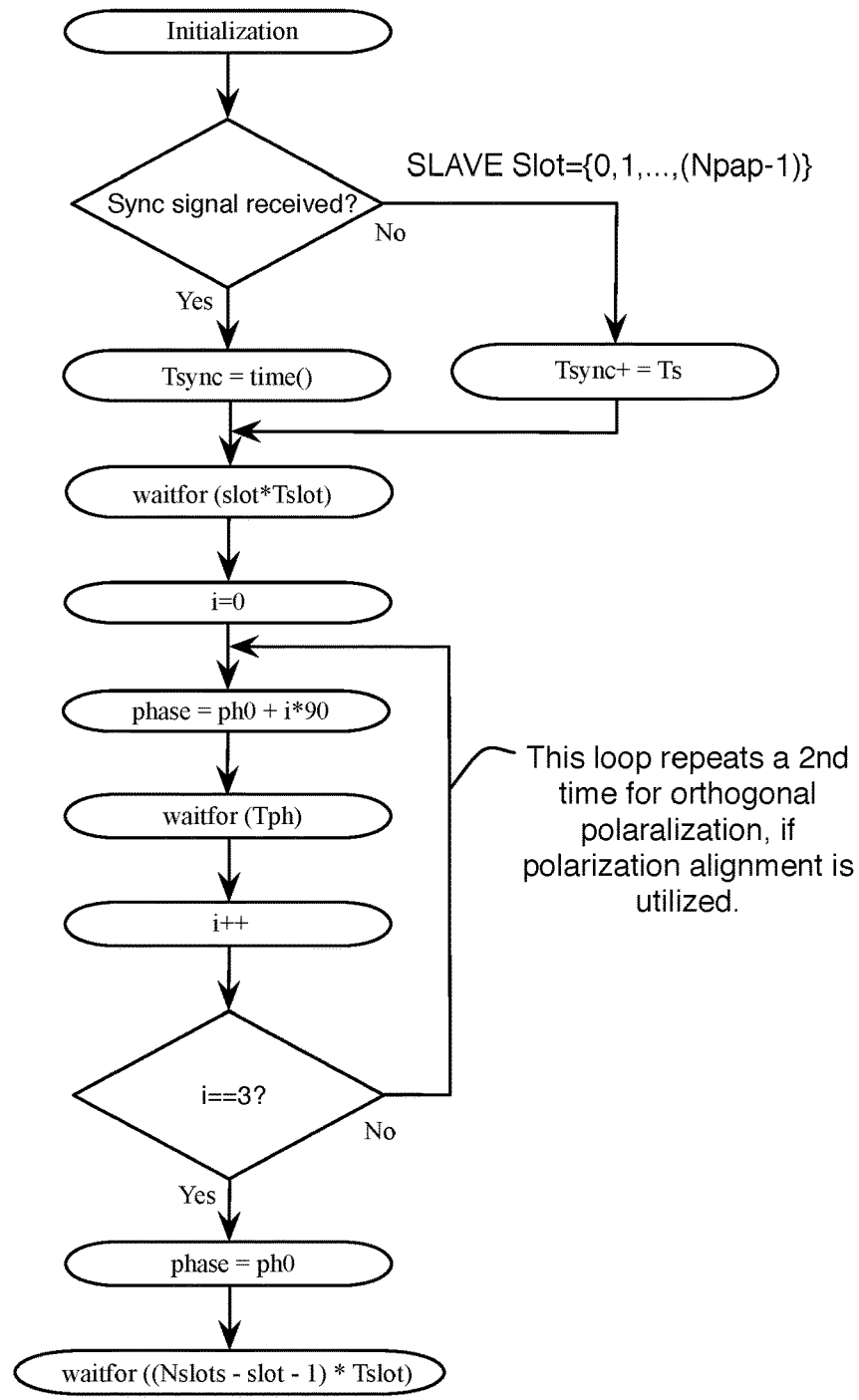
FIG. 4 is a flowchart representation of pseudo-code for phasor decomposition.

FIG. 4 is a flowchart representation of pseudo-code for phasor decomposition. The polarization alignment calculation begins with the following three equations representing a phasor with zero phase adjustment, with 90 degrees of adjustment, and with 180 degrees of adjustment, respectively:

$$S^2_{1N0} = A^2_1 + S^2_{2N} + 2*A_1*S_{2N}\cos(\varnothing_o) \quad [1]$$

$$S^2_{1N90} = A^2_1 + S^2_{2N} + 2*A_1*S_{2N}\cos(\varnothing_o + 90°) \quad [2]$$

$$S^2_{1N180} = A^2_1 + S^2_{2N} + 2*A_1*S_{2N}\cos(\varnothing_o + 180°) \quad [3]$$

By rearranging equations [1], [2], and [3] we derive the following equations [4] and [5], from the phase angle $\varnothing_o$ and amplitude $A_1$ are determined:

$$\tan(\varnothing_o) = 2*[\Delta S^2_{90}/\Delta S^2_{180}] - 1 \quad [4]$$

$$\beta_o = [\sin(\varnothing_o)*A_1/S_{1N}] \quad [5]$$

In the equations [1], [2], [3], [4] and [5], $S_{2N}$ represents the sum of all phasors except phasor 1; $S_{1N0}$, $S_{1N90}$, and $S_{1N180}$ represent the total sum of phasors, when phasor 1 is in the initial state (zero phase adjustment), when phasor 1 is rotated by 90 degrees, and when phasor 1 is rotated by 180 degrees, respectively; $\varnothing$ represents the phase angle between phasor 1 and $S_{2N}$; and $\beta_o$ represents the phase angle between phasor 1 and the total sum of phasors $S_{TN}$. After determining the phase angle and the amplitudes with equations [4] and [5], the procedure is repeated for another phasor, except the last one, which can be computed from the previous phasors. In total, there are 1+2*(N−1) RSSI measurements and phase adjustments.

PAP Synchronization and Master Selection Methods:
In one embodiment, a single master PAP is chosen. In another embodiment, there are no master PAPs, rather collaboration occurs between the PAPs to perform frequency tuning.

In one embodiment with comm-channel based synchronization using a SYNC, time-stamped message, the best master is the one that can communicate a Sync message to all PAPs with a low probability of error, (e.g., highest communication channel Signal to Noise Ratio (SNR) or lowest interference). In one embodiment using a separate RF frequency for synchronizing PAPs, the highest SNR on Sync RF frequency is required.

Example embodiments for synchronization between PAPs include one or more of the following: A wireless embodiment, includes an optical (e.g., Infrared) communications channel between the PAP and the energizable device, using one of a 100/120 Hz harmonic of a fluorescent light (passive), and sending pulses or a modulated signal from a master. A wireless embodiment, includes an acoustic communications channel between the PAP and the energizable device, wherein the master sends a tone or modulated signal, or uses an external source of a known signal (e.g., 120 Hz humming). A wireless embodiment, includes a radio frequency (RF) communications channel between the PAP and the energizable device, wherein the master PAP sends a continuous wave (CW) wave or modulated signal that other PAPs synchronize to.

An embodiment includes a distributed system wherein every PAP exchanges timing packets or (CW bursts) with every other PAP and adjusts their respective clocks to the average, which eventually converges. An external source of a known signal is used by the master PAP, including a 100/120 Hz or a harmonic of fluorescent lights or transformers, a Wi-Fi (timing) signal from router(s), a cellphone signal, or timing signal from a cellphone tower, or a GPS/Glonass, (with no master, but with an external antenna at each PAP.

In one embodiment of a PDM system, radioactive emission is used for synchronization, including an external source (e.g., smoke detectors), or an open loop isotope timing device (e.g., a Caesium atomic clock). In one embodiment of a wired system uses existing AC power lines for synchronization by locking to the 50/60 Hz or a harmonic thereof. In another embodiment, a master sends a Sync packet over a power line. In another embodiment having a distributed system of PAPs, every PAP exchanges timing packets (e.g., using Ethernet over a power line, or with load modulation). In another embodiment of a wired system, one or more PAPs use USB, RS232, or Ethernet. In another embodiment of a wired system, one or more PAPs use a dedicated coax with a single tone or modulated signal, or similar single wire. In another embodiment of a wired system, one or more PAPs use a guided wave propagation (e.g., a surface wave in drywall or in air ducts).

Synchronization of PAPs with a Master:

The deployment is assumed to be known (e.g. IP network topology, PAP clusterization) and masters are either assigned manually, or by an algorithm. In the case of Wi-Fi and similar protocols, there is a network discovery stage of operation, (e.g., at startup and once every X seconds), to get the MAC and/or IP addresses of PAPs connected within the cluster. In various embodiments, a known list of possible MAC addresses for a particular deployment is programmed into each PAP. In other embodiments, there is also Telnet/SSH to the router, getting an ARP table and looking for MAC addresses ranges corresponding to PAPs, with appropriate attention to security issues. After a list of connected PAP MAC and/or IP addresses is known, PAPs communicate with each other, (every Y seconds in one example).

There are many different types of information exchanged, such as Wi-Fi based coarse SYNC, PAP_MASTER_RSSI table, RAP_table (short/long version), sync messages, user messages (user to/from RAP sensor), status, and configuration for example.

If a master is not selected manually, during startup, or when a new PAP is discovered on the PAP cluster network, a master selection algorithm is initiated, (optionally suspending other tasks). In one example technique for master selection, all PAPs in the cluster are tried to be master, one by one, (by using a MAC address sort, or IP addr sort for example). For each candidate PAP, the communication (e.g., comm) channel of the candidate is set to TX, while other PAPs are set to RX. Any message is broadcast by the candidate via a comm channel, (ideally sync message, to reduce sync time), and RSSIs of this message are measured by all non-candidate PAPs, (at a predefined interval starting from Wi-Fi based coarse Sync, which is well within latency fluctuation of the router, such as 1 second). The PAP_MASTER_RSSI table is filled out by each PAP in the cluster (candidate ID, RSSI from candidate) for each candidate. At the end of the master trials each PAP has a table of RSSI for each possible master. These tables are exchanged by PAPs through Wi-Fi network or other comm channel. Since each PAP has the same set of tables, (same) decision is made on who should be the master. Since the best master is assumed to be the one which provides lowest probability of error SYNC message to all other PAPs in the cluster, a maximization of minimum RSSI in PAP_MASTER_RSSI table is one such choice, while another choice could be maximization of a weighted goal function such as Score=TotalRSSI*W1+minRSSI*W2, if minRSSI>threshold, Score=minRSSI*W3, if minRSSI<threshold. Clusterization is also optionally done at this point, and master per cluster is selected based on comm-channel connectivity graph and minRSSI values: masters are added until minRSSI is above threshold. For example, if we have a warehouse with 20 PAPs, and had one master in the middle it would cover 15 of PAPs but ones on the edges may not be receiving the Sync signal. To rectify this, we increase the number of masters, and try to optimize minRSSI again, until minRSSI is over the threshold value.

All PAP_MASTER_RSSI tables, side by side, for selecting one master (only a triangular portion of the table is unique, without the diagonal):

| PAP_1 | | PAP_2 | | | PAP_N | | |
|---|---|---|---|---|---|---|---|
| Candidate ID | RSSI | Candidate ID | RSSI | ... | Candidate ID | RSSI | Total min RSSI |
| 1 | N/A | 1 | A2 | ... | 1 | AN | min (A1...AN) |
| ... | ... | ... | ... | ... | ... | ... | ... |
| N | Z1 | N | Z2 | ... | N | N/A | min (Z1...ZN) |

After a master is selected for the first time, the master sends a sync signal, and other PAPs synchronize their clocks. Consecutive sync messages are sent by master at predefined accurate interval, such as 1s to 5s, (for a 1 ppb/s XTAL), derived from master's high stability Ovenized Crystal Oscillator (OCXO) (e.g., <1 ppb/s & 10 ppb/day drift OCXO is used in one prototype). Other PAP nodes compute the difference in time, which should be the time of sync-interval relative to their own OCXOs and compare the difference (highly deterministic chain, high priority interrupt on sync packet RX, MCU based counter based on OCXO clock). After the PAPs compute the difference in times, they calculate the relative frequency shift of their OCXO compared to master's and adjust OCXO tuning (according to a lookup table)+feedback+drift estimation. Due to the fact that the PDM algorithm is very fast (e.g., 10 us–1 ms) per PAP, even with OCXO drift the phase during that 10 us to 1 ms will not change significantly. At, for example, an unadjusted <1 ppb/s drift, the phase changes about <3 deg in 8*1 ms (8 PAPs). But during the time with no phase transitions (phases for optimal power delivery), 10 ms to 1s, the phase will shift by an amount, which depends on sync interval, and optimal power interval. This can be reduced by changing sync and optimum power interval adaptively (e.g., 1 second sync period Ts, 100 ms optimum power period Topt: <18 deg max error, much less on average).

Synchronization of PAPs without a Master:

Similar to the master selection procedure, in one example technique each PAP is tried to be a master, and PAP_MASTER_RSSI table is filled out by each PAP, but not in the cluster as before, but based on all PAPs in deployment. Unlike single master per cluster method, in this case, the master trial procedure is done every 100 ms 2s (not just at startup or when a new PAP is added). Along with Master candidate ID, RSSI from candidate, OCXO (Ovenized Crystal Oscillator) frequency difference is calculated for each candidate. An average of OCXO frequency differences is calculated and applied. This is repeated for each PAP. Over time all OCXOs will reach global average, same frequency. For example, two separate clusters of PAPs with one PAP added in between at a later stage, the average of each cluster is independent and settled, but adding a PAP in the middle will set an initial value of the middle PAP to the average of two clusters, while putting a small pressure on both clusters that moves their average, slowly, towards the middle PAP, and eventually the system will equalize. This procedure is much slower than the one with a single master, but can be sped up significantly if PAPs form a deterministic low-drift mesh network, avoiding comm-channel-based clusterization, and syncing to an overall average in Nsync intervals, where N is a mesh network depth, or max number of hops. The time to reach Sync is N times greater with a mesh network and perhaps hundreds of times greater if not using a mesh network (due to 'rolling' average), compared to master per cluster approach.

Energizable Device Synchronization to PAP Master:
One embodiment includes listening to the same SYNC signal as being sent from Master PAP to slave PAPs (as done in the present prototype). Another embodiment includes performing multiple RSSI readings and detecting changes in RSSI that correlate to the phase/polarization changes performed by PAPs.

PDM prototype implementation:
The PAP sync is done over a comm-channel, which the energizable device can listen on. When an energizable device has enough energy to listen for the duration of PAP sync cycle, the energizable device changes comm-channel freq to PAP sync channel and waits for sync. After receiving sync the energizable device goes to sleep, (with a timer on), and next wakes up on just before expected phase change if it has enough energy to perform transmisstion of the RSSI vector, (+ADC readings), if not then the energizable device sleeps some more (+Tsync err). If a brownout happens the procedure is repeated when there is again enough energy. Initial charging is done with a random phase, so it might take a while (statistically) to gather enough energy for first sync RX and first RSSI TX.

If the energizable device cannot receive sync, but has enough stored energy, it will look for RSSI changes and its variance over time and decide where the phase adjustment window is statistically (assuming that optimal power duration is constant). During optimal power interval the phase will change, (but slower), and will be proportional to reference drift+multi-RAP optimal power delivery phase adjustment; the phase can not jump quickly to change optimal combination for each energizable device. To detect changes in RSSI during phase changes the energizable device has to sample with ADC at higher rate than phase changes. So, for example, if 10 us phase changes at PAP are used RAP ADC has to sample at >300 KHz, but only during phase change interval=N*5*10 us+variance, where N=number of PAP, and variance is error due to desync.

If the energizable device receives some low energy due to a random phase, and charges at some point, but is below a harvester threshold for a long duration, the capacitor will discharge, and the energizable device will not have a chance to respond. In this case the solution does not improve the range, but this is a very rare case statistically.

Comparison to Iterative Algorithms:
Iterative algorithms take multiple reading of the RSSI values during optimization. Common types of algorithms include Gradient Ascent (Hill Climbing), Genetic Algorithm, Min/Max, LMS, and variations/combinations of these with added randomization to avoid local optimum.

Disadvantages of Iterative methods include multiple communication instances to achieve optimization. Since the RSSI needs to be measured at multiple points, there needs to be constant communication between RX and TX. Disadvantages of Gradient based methods include amplified noise (e.g., less robust in a realistic scenario). Gradient calculation is essentially a derivative calculation and small changes in independent variable lead to small changes in the dependent variable, (e.g., small phase changes greater than small RSSI changes). Disadvantages of Randomized and Genetic Algorithm based methods are that noise is not amplified at the beginning, but will be near the optimum. Additionally, convergence takes much longer, but convergence will occur at an absolute optimum point, but on the order of 10 to 100 times lower than with Hill Climbing.

Advantages of Iterative methods include not disturbing RSSI far from the optimum, after the optimum is achieved. Iterative methods also use a simple computation, where differences are computed for RSSI and the phase is adjusted by multiplying a constant, (e.g., gain constant), by the derivative, (e.g., partial derivative with respect to particular TX). The iterative method is a bit more computational complex compared to the Genetic Algorithm.

An embodiment of a Phasor Decomposition Method (PDM) finds all constituent signal amplitudes and phases at an energizable device. The total amplitude is measured $2*(N-1)$ times by adjusting individual Phasor phases by 90°, and 180° all sequentially ($\sim 2*(N-1)*50$ μs+Tcom), where N is the number of corresponding Phasors. PDM solves for all phases and amplitudes at all energizable device locations all at once (limited by the comm. channels), and thus optimizes power at all locations at once given power allocation priority. Compared to Hill Climbing, the speed improvement of PDM is on the order of $20*N-100*N$, where N is number of PAPs, (and the factor 20-100 depends on number of steps in Hill Climbing algorithm).

Consider a case with N PAPs with the same frequency and adjustable phases. At the receiver these amplitudes and phases are arbitrary altered due to multi-path propagation. For the purpose of this disclosure, the phases and amplitudes do not change in time, (e.g., measurements are done much faster than changes in amplitude/phase). To align the phases of the incoming waves at the receiver, a variety of methods can be employed, depending on trade-off of response speed, immunity to changes/noise. Phases can be adjusted incrementally, to slowly attempt to reach some optimal (typically local maximum) point. This can be done with a variety of algorithms, such as Gradient Ascent/Hill climbing, or Genetic Algorithms, or one can estimate the present state of phases/phases of individual Phasors using PDM to reach a global maximum in one step after having phases/phases. Due to the feedback nature of Hill Climbing, there needs to be constant communication between RX and TX for each "step climbed", which is not the case with PDM, as it can provides optimal in "one shot" by correlating phase changes and RSSI changes, thus saving power used for communication.

The effectivity of wireless RF power transmission is limited by increases in the operating frequency as well as an increased physical separation between PAPs and energizable devices, (e.g., user devices, receivers, or tags). These limitations are overcome by the use of multiple PAPs. The random deployment of multiple PAPs will not result in optimal reception at the location of the energizable device due to having multiple incoming waves with unknown, non-cohered phases, all constructively or destructively interfering with each other.

Further inefficiencies result from the polarization from each individual PAP directed towards an energizable device and the resulting summation wave at the location of the energizable device, specifically from the polarization of each PAP not being the same at the receiving location (e.g., due to reflections from the transmission medium). Polarization is also unknown and non-cohered at each energizable device and the effect of having arbitrary locations for each PAP, each with unique reflections and other conditions, will further complicate alignment of polarities arriving at the use device from a plurality of PAPs.

Even though a PAP may transmit a linearly polarized wave, the polarization received at an energizable device may be any combination of orthogonal polarizations due to multipath effects. The resulting polarization may be rotated linear (as discussed above), right or left-handed circular, or slant elliptical polarization.

In various embodiments, similar algorithms used for phase alignment are used to ensure that the polarization of the resulting summation wave at the receiving device has the same polarity as the constituent waves from each PAP. In one example the polarity is vertical. In other examples, the polarity is one of vertical, slant, horizontal, circular, elliptical or slant elliptical. For clarity in the exposition, in the following example embodiments, the aligned polarity is vertical. It should be understood that in other embodiments, other polarities are realizable without departing from the scope and spirit of this disclosure.

Figure 6:
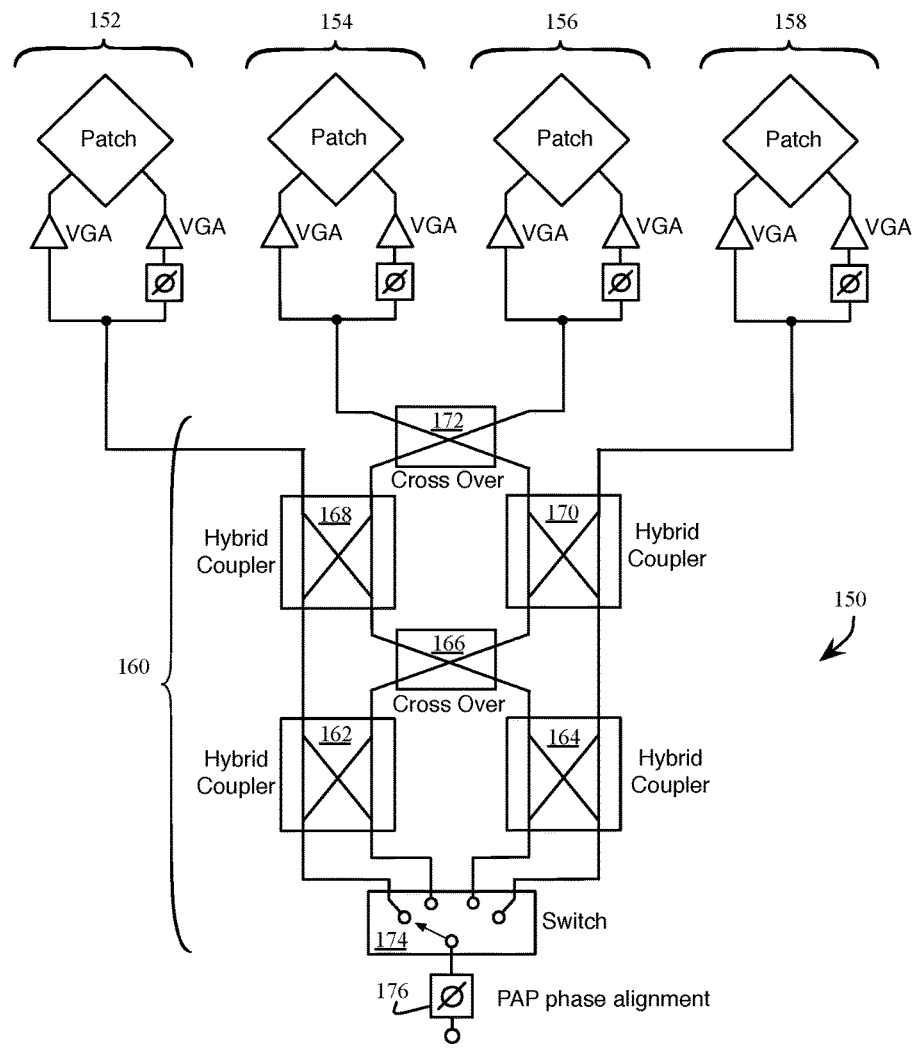
FIG. 6 is a schematic view of an embodiment for beam-steering using switched beams.

A switched beam is used to steer the transmit beam from each PAP. A switched beam structure is used requiring only a Butler matrix, incorporating cross-over structures, and a single-pole-multi-throw (SPMT) switch. In some embodiments, the crossover structure is a "Wight Crossover" structure. An example embodiment of this structure is shown in FIG. 6 for a four-element array. In other embodiments, a different number of elements are used (e.g., eight or sixteen elements). The four outputs from the SPMT switch each provide a different set of phase shifts to the four signals reaching the four patch antennae. These different sets of phase shifts cause the composite beam to form its maximum in a different direction or spatial angle (similar to a phase array). This corporate feed will provide a power boost of M at the energizable device, where M is the number of elements compared to a single antenna element.

Only energizable receivers that are at the intersection of the multiple beams from the multiple transmitters will be illuminated or energized. Within that intersection space, the multiple beams will have different polarizations at the different locations of the multiple receivers due to multipath propagation. The correct selection of the multiple transmitter polarizations are chosen such that either a) each receiver is sequentially receiving all transmitted signals with the same polarization, or b) all receivers are simultaneously receiving all transmitted signals with the largest "minimum-received-power" achievable at one of the receivers. This largest minimum-received-power occurs at any one of the receivers, wherein the other receivers receive more than the minimum-received-power. In various embodiments, the polarizations at the multiple transmitters are iteratively adjusted following a method (e.g., hill climbing or PDM), until the largest minimum-received-power at one of the receivers is achieved.

According to various embodiments, multiple PAPs are used to offset energy losses in the RF energy beam received at the receiving device, due to an increased separation distance between the PAPs and the energizable device. The energy beams received at the energizable device by their respective PAPs described herein, are all phase cohered by phase locking techniques ensuring all incoming signals at the energizable device arrive in phase, regardless of the position of each individual PAP.

According to the various embodiments, both the received phase and the frequency of each PAP used to simultaneously send power to one or more energizable devices are fixed and identical to the respective phase and frequency of all other PAPs. In one embodiment, the aforementioned, fixed and identical phase and frequency is achieved by phase locking all PAPs within range of a master PAP to a single predetermined master clock frequency.

The respective phase and frequency at the PAPs is locked continuously, while being monitored and adjusted in real-time. However, at the location of the energizable device the incoming polarization received from the multiple PAPs will not be the same because the PAPs are not all at the same physical location, nor is the path between each PAP and the receiving device the same. Each PAP has a unique source of reflections and other operation conditions relative to other PAPs.

The respective incoming EM waves of energy beams from multiple PAPs, (also referred to herein as "transmitter" or "Tx") may each have a different polarization at the location of the energizable device, (also referred to herein as "Rx"), as the PAPs are not physically aligned in space. In a worst-case example, the polarization of each EM wave at the Rx location will be orthogonal to another EM wave, (e.g., vertical and horizontal, or right-hand circular and left hand circular). In this case the total received power at the receiving device will be reduced by polarization misalignment.

In many embodiments, the multiple PAPs and receiving devices are all nominally within a horizontal plane, (e.g., on the same floor of a building), and their resulting directions of propagation (e.g., Poynting vectors) of all transmitted EM waves are nearly in the horizontal plane, making it possible to align all the incoming wave's polarization.

In one embodiment, the respective improvement in power received at the receiving devices, produced by polarization rotation of linear polarization from each Tx, results in all incoming waves at the Rx location to be vertically co-polarized, thereby increasing the Rx power by a factor of N, where N is the number of PAPs.

Use of the aforementioned technique for achieving polarization alignment results in an $N*N*N=N^3$ improvement in the power received at the receiving device, compared to using a single PAP. This improvement is due to three factors: a) use of N multiple PAPs, b) phase alignment of EM waves at the receiving device, and c) polarization alignment of EM waves at the receiving device. In comparison, arbitrarily deployed PAPs without phase and polarization alignment obtain only an N improvement over using a single PAP.

Figure 5:
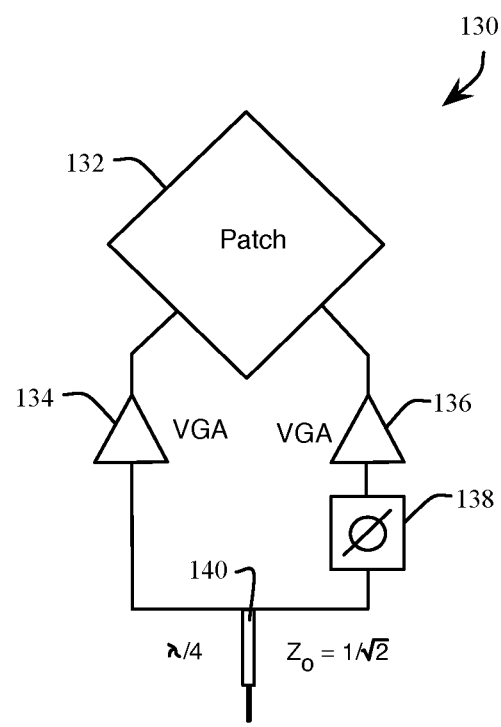
FIG. 5 is a schematic view of an embodiment of a controllable slant linear polarizer.

The polarization rotation used here, is achieved using polarization techniques on the antennas at the PAPs. In a first example, dual orthogonal polarizations are simultaneously transmitted, each having a specific amplitude, normalized between −1 and 1, from each PAP as shown in FIG. 5. The respective maximum polarization rotation needed for each PAP is +/−90 degrees to achieve vertical polarization summation at the receiving device.

With reference to FIG. 5, in the embodiment 130, a single feed 140 is amplified with a first variable gain amplifier (VGA) 134 and combined at a patch 132 with a second feed of the same signal. The second feed is amplified with a second VGA 136 and phase shifted with a phase shifter 138 over a range of zero degrees to 360 degrees. In one embodiment, the phase shifter of the second feed nominally shifts the phase of the signal by plus or minus 90 degrees. In another embodiment, both the first feed and the second feed are phase shifted to produce a differential phase shift between the first feed and the second feed from zero degrees to 360 degrees.

Furthermore, in one embodiment having three or more PAPs, the individual received polarizations at the location of the receiving device need to be vertical to enable full polarization alignment. Alternatively another polarization is used, being the same for each EM wave arriving at the receiving device from a respective PAP.

For the aforementioned PAPs, all transmitting a linearly polarized wave, the received polarization at the energizable device will be a combination of orthogonal polarizations due to multipath. This will result in polarizations which are rotated linear, right and left-handed multiple polarizations or slant elliptical polarization of the waves at the energizable devices.

According to some embodiments, the multiple PAPs individually adjust each of their polarizations of the EM waves as received by the energizable devices to form a resulting vertical wave at the receiving device.

The respective multiple PAPs simultaneously transmit dual orthogonal polarizations, each orthogonal polarization having a specific complex (amplitude and phase) normalized between 0 and 1. As is shown in FIG. 5, each transmitter has two amplifiers with variable gain (VGA) and at least one of them includes phase shifting capability between zero and 360 degrees.

In some examples, the multiple PAPs will use predetermined threshold values to make decisions on whether polarization alignment is needed. Furthermore, in various embodiments, the polarization alignment procedure uses measurements from the Receive Strength Signal Indicator (RSSI) from each energizable device. In other embodiments, other methods of measuring received power at the energizable device are used.

The RSSI measurement from each energizable device is transmitted back to the PAPs currently being aligned and, in one example, a hill-climbing algorithm is used to guide the polarization of each access point to its final state. In another embodiment, a PDM method is used to guide the polarization alignment to its final state.

In some embodiments, the respective PAP, uses switched beam beam-steering rather than phase array beam-steering. Phase array approaches perform exceedingly fast beam-steering, not required for power applications. Furthermore, phase array systems also require at least one phase shifter for each antenna element increasing system complexity and cost. The switched beam-steering structure 150 is shown in FIG. 6 and requires only one Butler matrix 160 (utilizing four hybrid couplers 162, 164, 168 and 170, and two Wight Crossover structures 166, and 172), and one single-pole-multi-throw switch 174. The embodiment 150 of the switched beam-steering structure includes four instances of controllable slant linear polarizers 152, 154, 156 and 158.

The switched beam beam-steering system incorporates a master phase shifter 176 to carry out the previously described phase alignment between multiple PAPs. A resulting power boost of M is achieved by using the switched beam antenna array approach. Here M represents the number of antenna elements compared to a single element, and is an additional factor to the previously described N*N*N increase.

In applications involving a multitude of receivers, such as in warehouses where the energizable devices are Radio Frequency Identification (RFID) tags, the determination of the location of each tag is important. Not only is it necessary to energize and read the RFID tags, it is desirable to determine on which shelf the tag is located. Since a warehouse is large and contains many stationary metal objects, (e.g. shelves), and dynamic metal objects, (e.g. forklifts), standard location techniques based on Direction Finding (DF), Angle Of Arrival (AOA), Time Difference Of Arrival (TDOA), and relative received power levels are not useful. There is a need therefore for location techniques, which work in a highly multipath environment.

In various embodiments, a power transmission system delivers power to receiving devices such as RFID tags from a group of PAPs, each of which is coherently locked to a common frequency. By adjusting the relative phase of the transmitted signal from each PAP, energy "bubbles" are created in three-dimensional space, and power is delivered to all energizable devices in each "bubble". As the energy "bubbles" are moved through the three dimensional (3D) space by changing the relative phases at the Power Access Points, different sets of energizable devices are energized. It should be noted that due to the multipath environment, which exists in the 3D space (e.g. warehouse), the actual locations of the "bubbles" may not be unambiguously determinable a priori.

It is thus desirable to determine the location of the energy "bubbles" for each set of relative phases at the Power Access Points, and also to reduce the number of "bubbles" simultaneous formed in the 3D space to one.

It should be noted that because an energy "bubble" is created from the phase alignment of the transmitted signals from each PAP, its size is related to the wavelength of the transmitted signals; nominally a half wavelength in each direction. For a transmitted signal at 915 MHz, the size of the bubble will be approximately 16 cm×16 cm×16 cm.

Location Determination:

In embodiments that include a warehouse, each energy "bubble" will illuminate a group of energizable devices (e.g., RFID tags), wherein each device is in close proximity to other device. As the energizable devices report their identity, (and data), the identities can be grouped. As the energy "bubble" is moved to an adjacent but undetermined location, some of the energizable devices will continue to report back, (because they are still being energized by the energy "bubble" in its new position) while other receiving devices (tags) will not (e.g., they are no longer being energized by the "bubble"). After a scan of the three-dimensional space by the "bubbles" a connectivity map can be created to show the nearest neighbors for each energizable device.

This connectivity map does not provide a physical location of each device. However, several "reference" energizable devices (e.g. RFID tags) can be placed throughout the three dimensional space in known locations. Accordingly, the energizable devices are located as nearest neighbors to the reference tags, and are located by using interpolation between groups associated with different reference tags based on the connectivity map to determine the position of all of the energizable devices. In some embodiments, such as those in which closeness of a receiving device to a PAP is determined, the respective locations of the PAPs are also used as reference locations. Collectively, the locations of the reference energizable devices and the locations of the PAPs are all reference locations.

In various embodiments, multiple energy "bubbles" will exist for each set of PAP relative phase settings, and the connectivity map will create multiple ambiguous locations for the energizable device locations. Advantageously, the number of energy "bubbles" simultaneously created will diminish as the number of PAPs employed to create the energy "bubbles" is increased.

First Method of Location Ambiguity Resolution:

The location ambiguity difficulty can be removed with the creation of a single energy "bubble" rather than the multiple "bubbles" that normally will exist. A method to create a single energy bubble in a highly multipath environment is based on True Time Delay. Here, in place of fixed relative phase shifts, the coherent transmissions from all PAPs are simultaneously ramped in frequency in a Frequency-Modulated Continuous-Wave (FM-CW) manner, or in a Pseudo-Noise (PN) Frequency-Hopping (FH) manner. Alternatively, all Power Access Points are simultaneously phase modulated or Direct Sequence (DS) spread in phase. As with the relative phase shift of the unmodulated PAPs, time delays of the modulation at each PAP will coherently combine to form an energy "bubble" only at locations where the True Time Delays are identical. This will greatly reduce the number of energy "bubbles" formed in a three-dimensional space, and hence will reduce (or even remove) the connectivity map ambiguity.

The location of the isolated energy "bubble" is controlled by the relative start times of the FM-CW ramp (or PN code for FH and DS spreading) at each PAP. As this relative start time is changed, the location of the isolated energy "bubble" is moved in the three-dimensional space. For each set of relative start times at the PAPs, the actual location of the isolated energy "bubble" is determined from the responses of the "reference" locations. The difficulty with the use of these ambiguity resolution techniques is that the bandwidth required (FM-CW ramp rate, FM hop rate) increases with the spatial resolution required. In most RFID tag location situations, this large bandwidth is not acceptable.

Second Method of Location Ambiguity Resolution:

Another method to resolving the location ambiguity of the energy "bubbles" is to separate the "bubbles" that are simultaneously formed into distinct, separate groups while composing the connectivity map. This separation operation along with the "adjacent" group connectivity operation will resolve most, if not all, location ambiguities. Along with the known locations of the reference energizable devices (or in some embodiments, the reference locations), a three-dimensional map of the location of all energizable devices in the three-dimensional space (e.g. warehouse) is generated.

First, beam-switching using the switched beam capability of the PAPs will separate the energy "bubbles" into subspaces. With each PAP having N selectable beams in the horizontal (Azimuth) plane, the (warehouse) space can be easily subdivided into $N^2$ subspaces. Here, the power of two reflects the number of spatial dimensions being covered, not the number of PAPs being employed. If additionally, the vertical (elevation) coordinate is divided into M beams, then the space can be subdivided into $M \times N^2$ subspaces. With multiple PAPs contributing to the formation of energy "bubbles" within one subspace, the probability of having multiple ambiguous energy "bubbles" is greatly reduced.

With a large space (e.g. a warehouse), the total space can be divided into distinct regions, with each region being subdivided into $N^2$ subspaces. Not only will this limit the range from the Power Access Points to the receiving devices, it will provide faster operation through parallel processing.

Further refinement of the separation of the space into distinct subspaces can be achieved. For energy "bubbles" that are substantially equidistant from all PAPs, the amplitudes of the signals from each PAP will be approximately the same. This is not necessarily true for an energy "bubble" that is near a single PAP, because it receives a major portion of its energy from that PAP. As a result, multiple simultaneous energy "bubbles" can be separated into multiple distinct groups, by sequentially switching off each of the PAPs, and observing which energizable device (e.g. RFID tag) responses "blink" on and off. The term "blink" as used herein means to shut off and return to the on-state when the PAP is switched back on. Alternatively or additionally, if a receiving device is enabled to return a Received Signal Strength Indication (RSSI), a "blink" is determined as a substantial change in RSSI. Those that "blink" are close to the PAP that is turned off, and those that do not "blink" are not. This procedure groups the multiple ambiguous energy "bubbles" into P+1 subspaces in the warehouse space (where P is the number of Power Access Points), greatly reducing the location ambiguity.

In one embodiment, a refinement of this technique includes simultaneously switching off two adjacent PAPs. Here the energizable devices that are located between the PAPs will "blink" on and off while the energizable devices that are far from the two PAPs will not. This technique may be extended to three or more adjacent or separate PAPs.

The location ambiguity can be further refined in the area where no one PAP's power dominates the total received power (e.g., in the area not close to any PAP). All energy "bubbles" are a product of the three dimensional standing wave pattern, and this standing wave pattern is created by the PAP's phases and the internal reflections of the warehouse. The multiple energy "bubbles" in the area not close to any PAP can be separated into subgroups by simultaneously rotating the polarization of all PAPs. The energy "bubbles" that rely strongly on the internal reflections of the warehouse will "blink" off, while those that do not rely strongly on the internal reflections will not. Ninety-degree polarization rotation will create the largest distinction between the two groups of "bubbles".

Several other values of polarization rotation can also be used to identify different subgroups of energy "bubbles", again by observing which energizable devices "blink" off and which do not. In addition to helping to resolve the location ambiguity of the RFID tags, this subgroup separation can also be used to help refine the connectivity map, in a manner similar to the PAP's phase change procedure.

Figure 7:
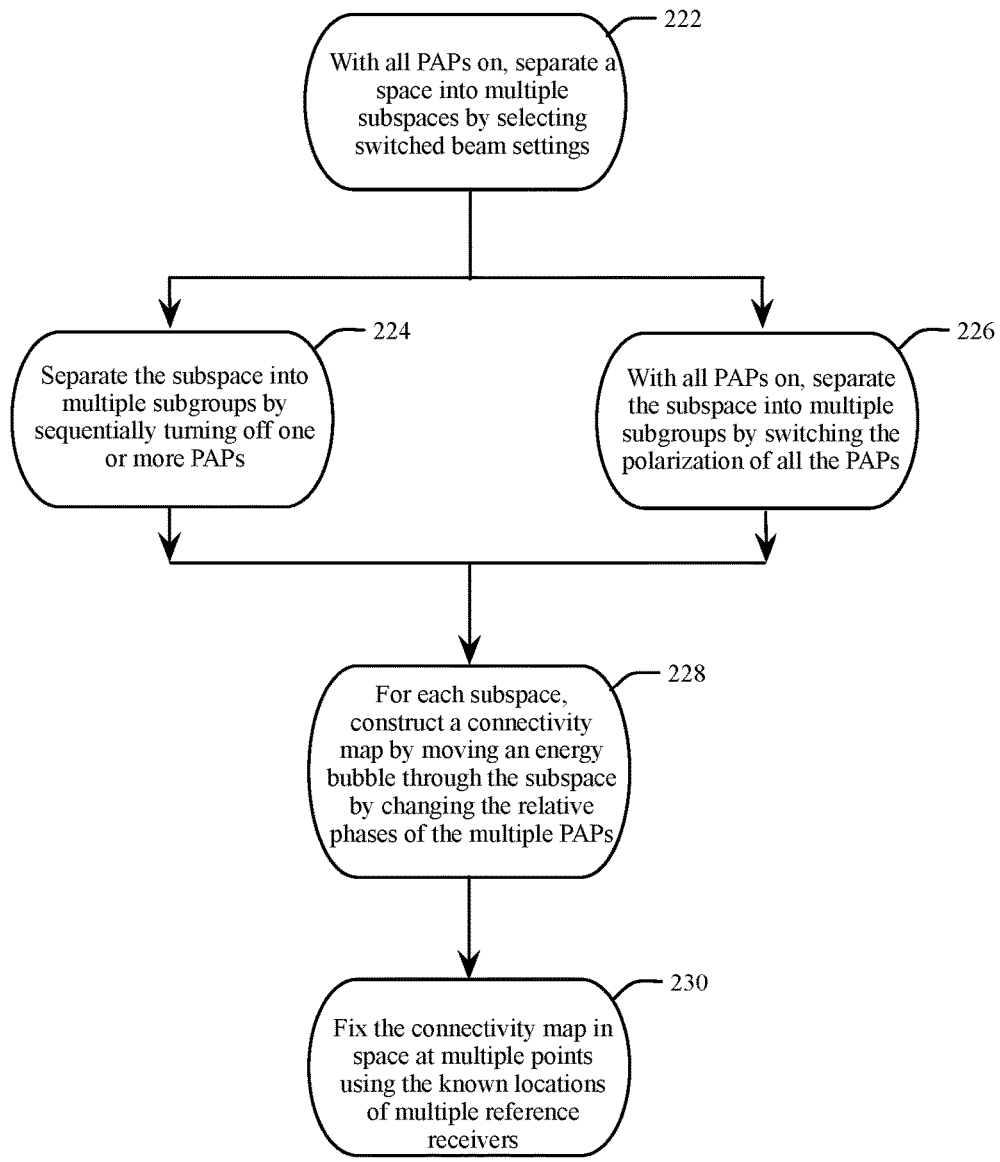
FIG. 7 is a flowchart representation of a method for generating a connectivity map.

By use of these grouping techniques of the energizable devices, a receiving device connectivity map can be generated without ambiguity. With the use of the known locations of the reference tags, a three dimensional map of the physical location of all tags in the warehouse can be generated. The methods for determining the location of energizable devices are illustrated in FIG. 7.

Specifically, at 222 with all PAPs on, the space is separated into multiple subspaces by selecting switched beam settings. At 224, the subspace is further divided into multiple subgroups by sequentially turning off one or more PAPs. At 226, the subspace is further divided into multiple subgroups by switching the polarization of all the PAPs. In one embodiment, step 226 is performed after step 224. In another embodiment, one or more of steps 224 and 226 are performed concurrently. At 228, for each subspace, a connectivity map is constructed by moving an energy bubble through the subspace by changing the relative phases of the multiple PAPs. In another embodiment, step 228 is performed on subgroups rather than subspaces. At 230, the connectivity map is fixed (determined) in space at multiple points using the known locations of multiple reference receivers, and the results of either the various connectivity maps from the plurality of subspaces or the plurality of subgroups.

Figure 8:
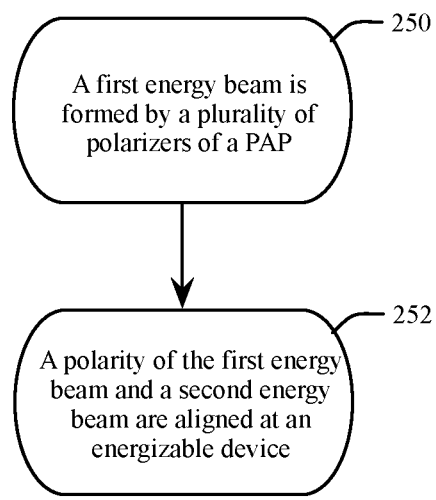
FIG. 8 is a flowchart representation of a method for improved wireless energy transfer in accordance with an embodiment of the present disclosure.

At FIG. 8, a method for improved wireless energy transfer includes steering a first energy beam formed by a plurality of polarizers of a PAP at 250. At 252, the polarity of the first and a second energy beam are aligned at an energizable device.

Figure 9:
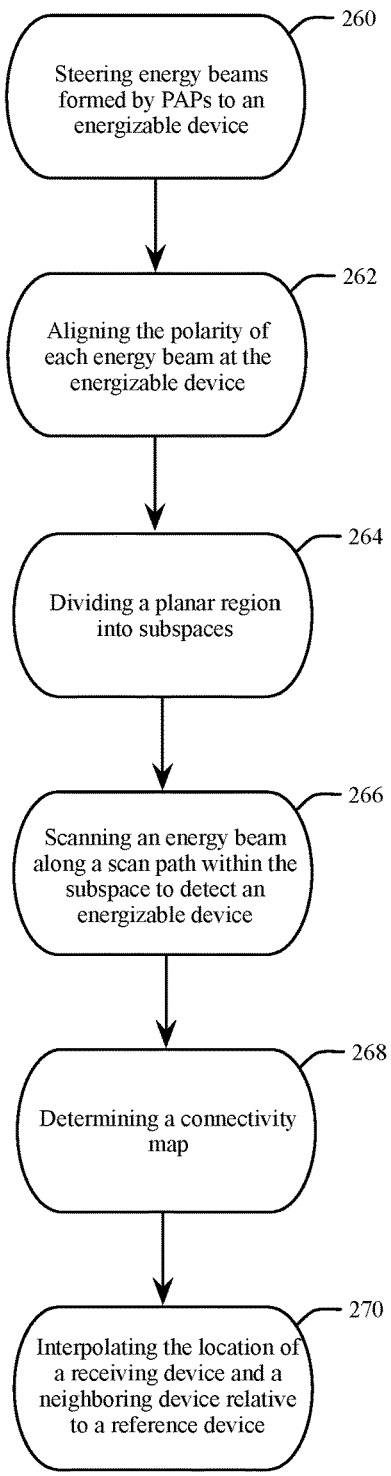
FIG. 9 is a flowchart representation of a method for improved wireless energy transfer in accordance with an embodiment of the present disclosure.

At FIG. 9, a method for improved wireless energy transfer includes steering energy beams formed by PAPs to an energizable device at 260. At 262, the polarity of each energy beam is aligned at the energizable device. At 264, a planar region is divided into subspaces. At 266, an energy beam is scanned along a scan path within the subspace to detect an energizable device. At 268, a connectivity map is determined. At 270, the location of a receiving device and a neighboring device relative to a reference device is interpolated.

ADDITIONAL EXAMPLE EMBODIMENTS

The following are example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims and their equivalents.

EC1: A method for energy beam optimization comprising:
receiving an energy beam at an energizable device from one of a plurality of PAPs, the energy beam having a plurality of transmitted phases including an initial transmitted phase during a first time slot, a second transmitted phase during a second time slot and a third transmitted phase during a third time slot;
storing a received signal strength indication (RSSI) at the energizable device for each of the transmitted phases, when the received RSSI changes by a threshold;
receiving at the PAP, each of the stored RSSI levels from the energizable device; and
determining a received amplitude and a received phase of the energy beam at the energizable device for the initial transmitted phase by the PAP.

EC2: The method of EC1, wherein the second transmitted phase is shifted by 90 degrees from the initial transmitted phase, and the third transmitted phase is shifted by 180 degrees from the initial transmitted phase.

EC3: The method of EC1, wherein the second transmitted phase is shifted by 180 degrees from the initial transmitted phase, and the third transmitted phase is shifted by 270 degrees from the initial transmitted phase.

EC4: The method of EC1, further comprising adjusting the received phase of the energy beam to be equal to a second received phase of a second energy beam transmitted by a second PAP.

EC5: A method for switched beam polarization alignment comprising:
steering a first energy beam towards a receiving device, the first energy beam transmitted by a plurality of antennae coupled to a PAP by a Butler matrix; and
aligning at the receiving device, a first polarity of the first energy beam to a second polarity of a second energy beam transmitted by another PAP by combining at each of the plurality of antennae a first polarized signal derived from the PAP with a second polarized signal, the second polarized signal formed by rotating the first polarized signal.

EC6: An antenna system comprising:
a patch antenna including a dielectric substrate interposed between a resonant plate and a ground plate, the patch antenna including a first feed-point and a second feed-point;
a first variable gain amplifier (VGA) connected to the first feed-point and configured to adjust a first amplitude of a signal;
a first phase shifter interposed between the signal and the first VGA and configured to adjust a phase of the signal; and
a second VGA connected to the second feed-point and configured to adjust a second amplitude of the signal, the patch antenna controlling a slant linear polarization of the signal.

EC7: The system of EC6, wherein the phase is greater than or equal to zero degrees and less than or equal to 360 degrees.

EC8: A switched beam polarization alignment system comprising:
a four or more antenna systems, each antenna system comprising a patch antenna including a dielectric substrate interposed between a resonant plate and a ground plate, the patch antenna including a first feed-point and a second feed-point, a first VGA connected to the first feed-point and configured to adjust a first amplitude of a signal, a first phase shifter interposed between the signal and the first VGA and configured to adjust a phase of the signal, and a second VGA connected to the second feed-point and configured to adjust a second amplitude of the signal, the patch antenna controlling a polarization of the signal;
a first cross-over device coupled to a first pair of the antenna systems;
a first pair of hybrid couplers coupled to the first cross-over device and a second pair of the antenna systems;
a second cross-over device coupled to the first pair of hybrid couplers;
a second pair of hybrid couplers coupled to the second cross-over device and the first pair of hybrid couplers;
a switch coupled to the second pair of hybrid couplers; and
a phase shifter coupled between an output of a power access point and the switch.

EC9: A method for determining a receiver location comprising:
dividing a planar region including a plurality of devices into a plurality of subspaces, each subspace defined by a beam position from a respective one of a plurality of energy beams;
scanning the respective one of the energy beams along a scan path within the subspace to detect a presence of at least some of the plurality of devices by detecting a change in a received energy at each of the at least some of the plurality of devices, the at least some of the plurality of devices including an energizable device, and one or more of a neighbor device and a reference device, the reference device having a predetermined location within the planar region;
determining a connectivity map by finding a respective position for each neighbor device relative to a position of the receiving device; and
interpolating a physical location of the receiving device and the neighbor device relative to the reference device.

EC10: The method of EC9 wherein the location of the receiving device is determined within one wavelength of the respective one of the energy beams.

EC11: The method of EC9 wherein each subspace is dividing into smaller spaces by sequentially deactivating one energy beam and detecting the presence of a receiving device by a reduction in the received energy at the receiving device.

EC12: The method of EC9 wherein each subspace is dividing into smaller spaces by sequentially deactivating two physically adjacent energy beams and detecting the presence of a receiving device between the two physically adjacent energy beams by a reduction in the received energy at the receiving device.

EC13: The method of EC9 wherein each subspace is dividing into smaller spaces by rotating a polarity of all of the energy beams and detecting the presence of a receiving device by a reduction in the received energy at the receiving device.

EC14: Location determination and ambiguity resolution based on separating the space to be covered into subspaces, generating a connectivity map of multiple receivers within each subspace, and using the known locations of reference locations to establish known positions within the connectivity map.

EC15: The separation of the space into subspaces is achieved using multiple switched beam antennas to divide the area into $N^2$ subspaces in the horizontal (Azimuth) plane where N is the number of beams available in the horizontal plane from each PAP.

EC16: The separation of the space into subspaces can be extended into the vertical (Elevation) coordinate with M vertical beams, resulting in a total number of subspaces in three dimensions of $M \times N^2$.

EC17: The separation of the space into subspaces can be also increased by sequentially turning off each PAP to separate the region into multiple close and far subspaces.

EC18: The separation of the space into subspaces can be further increased by sequentially turning off two or more, adjacent or separated PAPs to separate the region into additional subspaces.

EC19: The separation of the space into multiple subspaces can also be increased by sequentially employing orthogonal polarizations to separate close but not adjacent receivers.

EC20: The separation of the space into multiple subspaces can be further increased by sequentially employing other values of polarization to separate close but not adjacent receivers.

EC21: The connectivity map is generated by selecting a subspace to be illuminated with the switched beam antennas, moving the energy bubbles throughout the subspace by changing the relative phases of the multiple PAPs, and observing which receivers "blink" on and off when one or more PAPs are switched off, or when the polarization is rotated.

EC22: The connectivity map is fixed in space at multiple points through the known locations of the reference locations.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system for improved wireless energy transfer comprising:
    a first power access point (PAP) configured to direct a first energy beam to an energizable device, the first energy beam having a fundamental frequency and a first polarity; and
    a second PAP physically separate from, and having a wireless connection to, the first PAP, and configured to direct a second energy beam to the energizable device, the second energy beam having the fundamental frequency and a second polarity, a plurality of polarizers of the first PAP configured to form the first energy beam directed to the energizable device, and to align the first polarity with the second polarity at the energizable device, and
    wherein the second PAP is enabled to receive a PAP signal via the wireless connection and is further enabled to locally generate the fundamental frequency from the PAP signal.

2. The system of claim 1 wherein each of the polarizers include:
    a patch antenna including a dielectric substrate interposed between a resonant plate and a ground plate, the patch antenna including a first feed-point and a second feed-point,
    a first variable gain amplifier (VGA) connected to the first feed-point and configured to adjust a first amplitude of a signal,
    a first phase shifter between the signal and the first VGA and configured to adjust a phase of the signal, and
    a second VGA connected to the second feed-point and configured to adjust a second amplitude of the signal, the patch antenna controlling a polarization of the signal.

3. The system of claim 2 wherein the first phase shifter is configured to shift the phase of the signal over a range from minus 90 degrees to plus 90 degrees.

4. The system of claim 2 further comprising a second phase shifter between the signal and the second VGA, wherein the first phase shifter and the second phase shifter both produce a combined shift of the phase of the signal over a range from minus 90 degrees to plus 90 degrees.

5. The system of claim 1 wherein a number of the plurality of polarizers is divisible by two, and each polarizer is connected to an antenna signal with a Wight Crossover structure.

6. The system of claim 5 wherein the number of polarizers is four and includes:
    a first cross-over device coupled to a first pair of polarizers,
    a first pair of hybrid couplers coupled to the first cross-over device and a second pair of polarizers,
    a second cross-over device coupled to the first pair of hybrid couplers,
    a second pair of hybrid couplers coupled to the second cross-over device and the first pair of hybrid couplers,
    a switch coupled to the second pair of hybrid couplers, and a master phase shifter coupled between the antenna signal and the switch.

7. The system of claim 1 wherein the first polarity is one of vertical, slant, horizontal, circular, elliptical and slant elliptical.

8. The system of claim 1 wherein a received signal strength indicator received from the energizable device by the first PAP is used to optimize the alignment of the first polarity with the second polarity.

9. The system of claim 8 wherein optimizing the alignment uses a phasor decomposition method.

10. A method for improved wireless energy transfer comprising:
   steering a first energy beam, having a fundamental frequency, towards an energizable device, the first energy beam formed by a plurality of polarizers of a first power access point (PAP); and
   aligning at the energizable device, a first polarity of the first energy beam to a second polarity of a second energy beam, having the fundamental frequency and formed by a second PAP, physically separate from, and having a wireless connection to, the first PAP, by combining at each of the polarizers of the first PAP a respective first polarized signal with a respective second polarized signal, the respective second polarized signal formed by rotating the respective first polarized signal, and the second PAP receiving a PAP signal via the wireless connection and locally generating the fundamental frequency from the PAP signal.

11. The method of claim 10 wherein each of the polarizers of the first PAP combines a rotated first polarized signal with the respective second polarized signal, the second polarized signal having a different rotation than the rotated first polarized signal.

12. The method of claim 10 wherein the aligning of the first polarity to the second polarity is optimized based on a received signal strength indicator (RSSI) received by the energizable device.

13. The method of claim 12 wherein the aligning uses a phasor decomposition method.

14. The method of claim 12 wherein the first energy beam and the second energy beam are both sequentially moved from the energizable device to another energizable device, and the alignment is optimized by another RSSI received by the another energizable device.

15. The method of claim 12 wherein the alignment is optimized concurrently for the energizable device and another energizable device by maximizing the minimum RSSI from each of the energizable device and the another energizable device.

16. A method for improved wireless energy transfer comprising:
   steering a plurality of energy beams to an energizable device, each energy beam having a fundamental frequency and formed by a respective power access point (PAP) having a plurality of polarizers, each PAP being physically separate from, and having a wireless connection to, another PAP, one of the PAPs receiving a PAP signal via the wireless connection and locally generating the fundamental frequency from the PAP signal;
   aligning at the energizable device, a polarity of each of the energy beams by combining at each of the polarizers of each respective PAP, a respective first polarized signal with a respective second polarized signal, the respective second polarized signal formed by rotating the respective first polarized signal;
   dividing a planar region including a plurality of energizable devices into a plurality of subspaces, each subspace defined by an energy beam position from a respective one of the plurality of energy beams;
   scanning the respective one of the energy beams along a scan path within the subspace to detect a presence of at least some of the plurality of energizable devices by detecting a change in a received energy at each of the at least some of the plurality of energizable devices, the at least some of the plurality of devices including a receiving device, and one or more of a neighbor device and a reference device, the reference device having a predetermined location within the planar region;
   determining a connectivity map by finding a respective position for each neighbor device relative to a position of the receiving device; and
   interpolating a physical location of the receiving device and the neighbor device relative to the reference device.

17. The method of claim 16 wherein the location of the receiving device is determined within one wavelength of the respective one of the energy beams.

18. The method of claim 16 wherein each subspace is dividing into smaller spaces by sequentially deactivating one energy beam and detecting the presence of a receiving device by a reduction in the received energy at the receiving device.

19. The method of claim 16 wherein each subspace is dividing into smaller spaces by sequentially deactivating two physically adjacent energy beams and detecting the presence of a receiving device between the two physically adjacent energy beams by a reduction in the received energy at the receiving device.

20. The method of claim 16 wherein each subspace is dividing into smaller spaces by rotating a polarity of all of the energy beams and detecting the presence of a receiving device by a reduction in the received energy at the receiving device.

* * * * *